Figure 1:
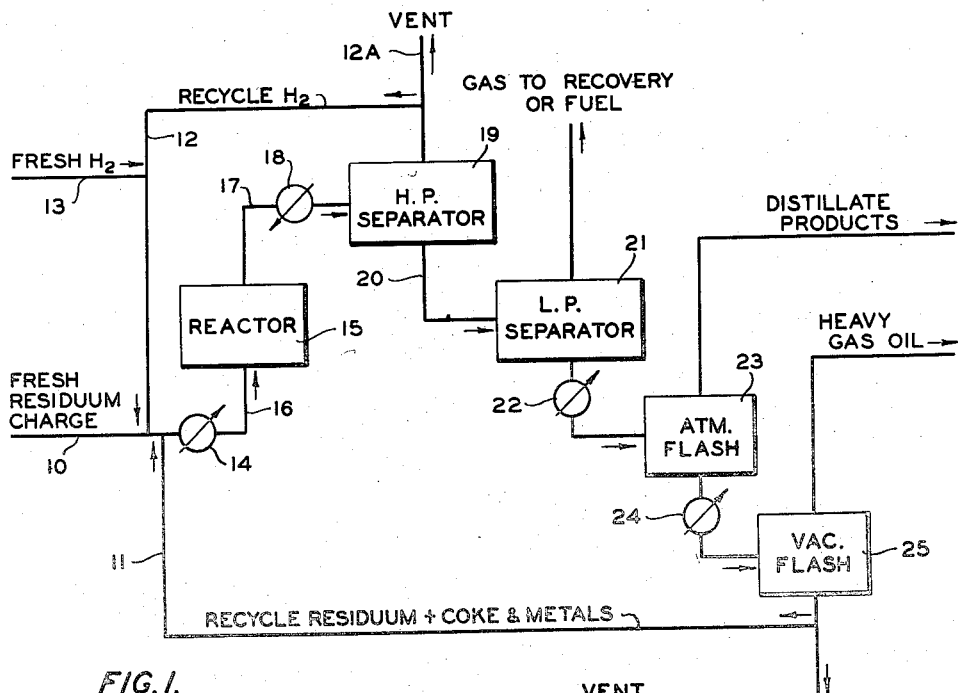

Dec. 16, 1958    W. C. LANNING ET AL    2,864,762
HYDROGENOLYSIS OF PETROLEUM HYDROCARBONS
Filed March 30, 1953

INVENTORS
W.C. LANNING
R. T. WILSON

BY Hudson and Young

ATTORNEYS

United States Patent Office 2,864,762
Patented Dec. 16, 1958

2,864,762

HYDROGENOLYSIS OF PETROLEUM HYDROCARBONS

William C. Lanning and Reagan T. Wilson, Bartlesville, Okla., assignors to Phillips Petroleum Company, a corporation of Delaware Application March 30, 1953, Serial No. 345,462

3 Claims. (Cl. 208—112)

This invention relates to treatment of petroleum hydrocarbons. In a more specific aspect this invention relates to hydrogenolysis of residual hydrocarbon fractions. In another specific aspect this invention relates to the hydrogenolysis of petroleum residue employing a catalyst produced in situ.

The refining of crude petroleum results in the production of high boiling residues which in the past, have been used as furnace oils or have been discarded. However, with the increasing demand for gasoline and diesel fuel and a decreasing demand for heavy fuel oils it is highly desirable that a process be utilized for converting these heavy residues to utilizable products. The hydrogenolysis reaction is especially applicable to heavy petroleum fractions such as heavy oils, high boiling tarry fractions, reduced crude and other heavy hydrocarbon products such as those resulting from the cracking of crude petroleum oil. Products of hydrogenolysis of such charge stocks include normally gaseous fractions, gasoline, kerosene, diesel fuel, gas oil, and the like.

The term hydrogenolysis as used in this invention, means destructive hydrogenation wherein cracking and hydrogenation reactions are taking place simultaneously. Hydrogenolysis, as distinguished from hydrogenation wherein the simple addition of hydrogen to unsaturated bonds takes place, in cracking under hydrogenation conditions so that the products of the cracking reaction are substantially more saturated than when hydrogen or materials supplying hydrogen are not present.

Although such reactions can be conducted non-catalytically, catalytic reactions are practical from the products standpoint and yield. Hydrogenolysis catalysts commonly used include oxides of molybdenum, chromium, and vanadium, and sulfides of molybdenum, tungsten and nickel. One difficulty commonly encountered in such a process is short catalyst life, which results from excessive carbon deposition on the catalyst surface. In many such instances the deposition of carbon is so great as to impede appreciably the passage of reactants. This is true because such catalytic processes are usually conducted over a fixed bed catalyst.

In at least one aspect of this invention, each of the following objects will be obtained:

An object of this invention is to provide a process for the hydrogenolysis of petroleum.

Another object is the provision of a catalytic process for the hydrogenolysis of petroleum wherein the catalyst is produced in situ. Still another object is to provide a method for the catalytic hydrogenolysis of petroleum wherein the catalyst is produced in situ in the process and is activated by heavy metals contained in the petroleum charge. Still another object is to provide the catalytic method for the hydrogenolysis of petroleum wherein heavy metal contaminants are removed from the petroleum charge and the products of the process by being adsorbed on the catalyst.

Other objects will be apparent to one skilled in the art from the accompanying discussion and disclosure of this invention.

In accordance with this invention, petroleum residues are subjected to hydrogenolysis in a reaction zone in the presence of suspended coke which is formed in the reaction and which is recycled to the reaction zone as catalyst. Heated charge stocks together with hydrogen, and coke suspended in liquid residuum from the process and recycled to the reaction chamber, are introduced at a lower point in the reaction chamber and reaction products are removed from the top of the reaction chamber after suitable reaction time. The reaction products removed from the reaction zone comprise a mixture of hydrogen, hydrocarbon vapors and liquid hydrocarbons containing suspended therein, coke catalyst. Hydrogen is removed from the reaction products and is recycled to the reaction chamber and fresh hydrogen is added as needed to make up the required amount of hydrogen. Hydrocarbon vapors are processed or are used as fuel and the liquid reaction products are separated into light and heavy hydrocarbons. The residue which is that portion boiling above the gas oil fraction is removed from the process and is useful as fuel or for other purposes. A portion of this residue is recycled to the reaction zone to furnish the catalyst for the reaction. The catalyst is suspended coke formed in the reaction and containing adsorbed thereon, heavy metals which are removed from the hydrocarbon charge stock.

Products of the process of this invention include normally gaseous hydrocarbons, such as ethane, propane, and butenes; gasolines, diesel oil, fuel oil, and light and heavy gas oil. The products of the process, which are obtained in major yields, are gasoline and diesel oil.

In the drawing, Figure 1 illustrates diagrammatically one preferred method of the operation of our process wherein the reactants from the reaction chamber are cooled before the recycle hydrogen-containing gas is separated from the mixture.

Figure 2:
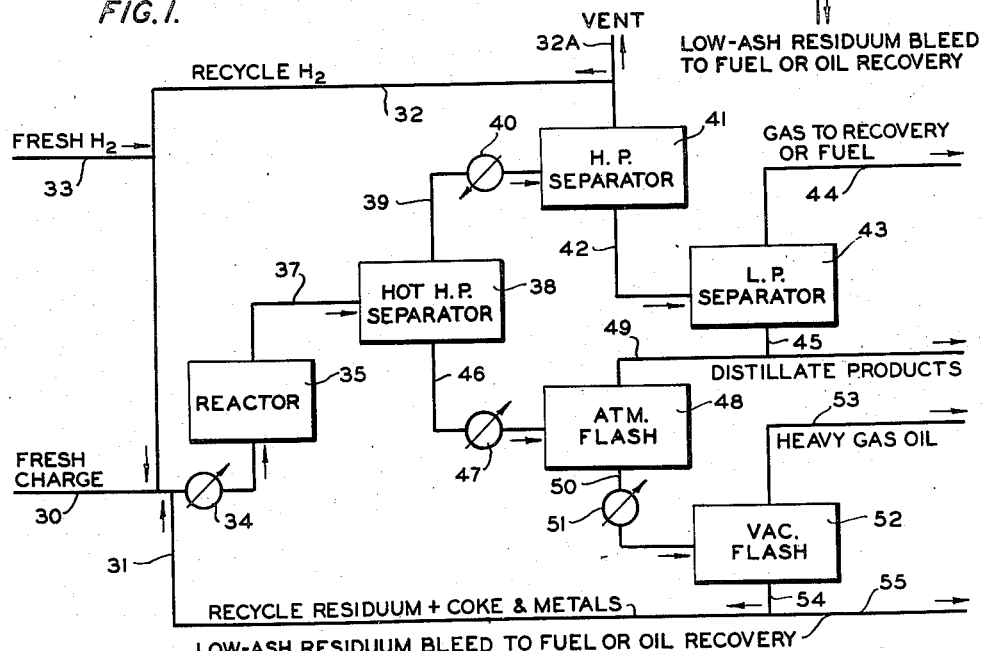

Another preferred method of operation is shown diagrammatically in Figure 2 wherein the vapors are separated from the reaction mixture recovered from the reaction chamber without cooling and only the separated vapors are cooled prior to separation of the hydrogen rich stream for recycle to the reactor.

Referring now to the embodiment of Figure 1 petroleum residue charge stock in line 10, for example a reduced crude having an initial boiling point in the range of 700 to 850° F., is admixed with recycle residuum, containing the coke catalyst, from line 11, and with fresh and recycle hydrogen supplied through line 13. Each recycle stream is described more fully elsewhere in this specification. The admixture is heated to a temperature in the range of 625 to 950° F. in preheater 14 and passed to the bottom of reactor 15 through line 16. Reactor 15 is maintained at a temperature in the range 825 to 950° F. and a pressure in the range 500 to 5000 pounds per square inch gauge. The reaction products are removed from the top of reactor 15 through line 17, cooled to cooling water temperature in heat exchanger 18 and passed to high pressure separator 19 where a liquid phase and a vapor phase are formed and light gases comprising a major amount of hydrogen and a minor amount of fixed gases are removed and returned to the reactor through recycle line 12. The liquid phase in high pressure separator 19 is passed through line 20 to low pressure separator 21 where again liquid and vapor phases are formed and gases comprising liquefiable hydrocarbon, resulting from the reduction in pressure, are removed as vapor and passed to fuel or to recovery. The liquid products in low pressure separator 21 are heated in heater 22 and passed to an atmospheric pressure zone 23 where distillate products, including gasoline, are removed as vapor. The remaining liquid in atmospheric pressure zone 23 is heated in heater 24 and passed to vacuum flash zone 25 where gas oils are removed as a vapor. Liquid products are removed from vacuum flash zone 25 comprising low-ash residuum containing suspended therein coke which is formed in the process and which has adsorbed upon it metal contaminates contained in the fresh charge stock. A portion of this residuum is recycled to the reactor so as to supply the coke catalyst and the remainder of the residuum is passed to fuel or to an oil recovery process.

In the embodiment of this invention as illustrated in Figure 2, petroleum residue charge stock in line 30 is admixed with recycle residuum containing a coke catalyst, and with fresh and recycle hydrogen lines 32 and 33, heated in preheater 34 and passed to reactor 35 similar to the modification as shown in Figure 1. In this modification however, the reaction products are taken from the top of reactor 35 through line 37 directly to high pressure separator 38 without any cooling step. The reaction products are separated into a vapor phase and a liquid phase in separator 38 and the vapors are taken from separator 38 through line 39 and cooler 40 to high pressure separator 41 where the vapors and condensed liquid are separated into two separate phases and the vapor comprising substantially hydrogen, is removed by way of line 32 so as to furnish recycle hydrogen to the reactor. The liquid from separator 41 is then passed to low pressure separator 43 where the pressure is reduced to substantially atmospheric pressure resulting in formation of a vapor phase and a liquid phase and vapors are passed through line 44 to gas recovery system or to fuel. The liquid phase from separator 43, comprising distillate products, are removed from separator 43 through line 45 and removed from the process.

The liquid phase in separator 38 is removed through line 46 and passed through heater 47 to atmospheric flash zone 48 and the resulting vapors, which comprise distillate products, are removed from this zone and combined with the distillate products taken from low pressure separator 43 through line 45 and passed from the system. The liquid phase from flash zone 48 is removed through line 50, heated in heater 51 and passed to vacuum flash zone 52. The vapors from vacuum flash zone 52, comprising gas oil fractions, are removed through line 53 for other processing. The liquid phase in vacuum flash zone 52, comprising low-ash residuum containing suspended coke formed in the process, which has adsorbed upon it metals contained in the charge stock, is removed through line 54 and passed to fuel or oil recovery through line 55. A portion of this residuum sufficient to furnish the catalyst necessary for the reaction is returned to the reactor through line 31.

For convenience and clarity, certain apparatus, such as, surge tanks, pumps, compressors, accumulators, valves, etc. have not been shown in the drawing. Obviously various modifications of this invention can be practiced without departing from the scope of the invention.

The recycle hydrogen in line 12 of Figure 1 and in line 32 in Figure 2 will usually have a purity of 80 to 90 percent hydrogen, the remainder being substantially light hydrocarbons. If a higher purity hydrogen stream is desired it can be obtained by employing a scrubber between the hydrogen separator and the reactor.

The recycle residuum stream shown in line 11 of Figure 1 and line 31 of Figure 2 will contain suspended coke formed in the process which supplies the catalyst for the reactor. The amount and kind of activating metals adsorbed upon the coke in recycle line 31 and recycle line 11 will depend upon the nature of the crude processed. Crude having high metal content are particularly desirable in this process and it is to be considered within the scope of this invention to employ residuum from high metal content crudes in a process for the hydrogenolysis of crudes containing lesser amounts of metallic contaminants.

The use of crude of high metal content provides high promoter content of the coke and catalyst. Metals such as iron, nickel, and vanadiums in the charge are deposited on the coke which produces a solid material containing the necessary promoters to make an effective catalyst for this type of hydrogenolysis process. This is especially effective in the processing of undesirable crudes which often have a high metal, sulfur, and asphalt content. Addition of a high metal stock to a charge stock whose metal content is less than that required to effectively coat the catalyst increases the efficiency of the catalyst. Crude residuum containing 60 to 600 p. p. m. or higher of metals can be used in this process. Crude residua containing 200 to 600 p. p. m. or higher of metals are preferred, however. Residua produced from tar sands as well as those produced from petroleum are suitable for use in this process.

Coke catalyst containing the metal promoter is produced in situ by hydrogenolysis of the residuum. The charge stock, in the presence of hydrogen and the catalyst, is normally subjected to a temperature in the range from 825 to 950° F. preferably 850 to 900° F. at a pressure in the range from 500 to 5000 pounds per square inch gauge, preferably 1000 to 3000 pounds per square inch gauge, for a time sufficient to cause substantial destructive hydrogenation whereby coke is formed in the process. The charge rate expressed as liquid hourly space velocity may vary from 0.1 to 5, preferably 0.5 to 2 volumes of oil per volume of reactor space. Hydrogen flow rate can vary from 500 to 20,000 preferably 5,000 to 10,000 cubic feet per barrel of oil. The catalyst is maintained in an amount of from 2 to 20 weight percent, preferably 4 to 8 weight percent of the oil. The coke catalyst can be removed from the residuum resulting from the process by filtration, centrifugation, or other suitable separation means for the recycle in case it is not desired to recycle the coke in the residuum as produced.

EXAMPLE

A run was made in which a low metal-content residuum, boiling above 1100° F., was subjected to hydrogenolysis in the absence of a catalyst, to obtain coke for use as a catalyst in a second run. The liquid product was centrifuged to obtain a decant oil and a sludge containing the coke. The sludge was then added to fresh residuum to form the total feed, including coke catalyst, for the second run. Accordingly, the composition of the feed, exclusive of coke, for the second run was as follows:

| Component: | Weight percent |
|---|---|
| Fresh residuum, 1100° F. + | 71.4 |
| C$_5$ to 1100° F. | 18.6 |
| Recycle 1100° F. + | 3.1 |
| Asphaltenes | 6.9 |

To show the effect of the coke catalyst, the results of the two runs, calculated to 81 percent yield, are compared below:

|  | With Catalyst | Without Catalyst |
|---|---|---|
| Run No. | 1 | 2 |
| Catalyst | ᵃ Coke | None |
| Temp., F. | ᵇ 868 | ᵇ 873 |
| Pressure, p. s. i. g. | 5,000 | 5,000 |
| LHSV | 2.2 | 2.2 |
| Single Pass Yield: |  |  |
| C$_1$ to C$_4$ | 4.8 | 4.3 |
| C$_5$ to 1,100° F. | 74.6 | 73.0 |
| 1,100° F. + | ᶜ 19.2 | ᶜ 19.2 |
| Coke | 1.4 | 3.5 |
| Conversion of 1,100° F. + oil | 80.8 | 80.8 |
| Ultimate Yield: |  |  |
| C$_1$ to C$_4$ | 5.9 | 5.3 |
| C$_5$ to 1,100° F. | 92.3 | 90.4 |
| Coke | 1.8 | 4.3 |

ᵃ 3.9 percent of total charge or 5.0 percent of 1100° F.+ material.
ᵇ Average along the reactor length after lining out.
ᶜ Includes asphaltenes which are believed to convert in the same manner, but more slowly, as 1100° F.+oil.

It is to be noted that the yield of coke was lower in the run in which coke was used as catalyst than in the thermal run. This resulted in an increase in yield of $C_5$ to 1100° F. material and a smaller increase in $C_1$ to $C_4$ material. The results are even more favorable where the coke catalyst comes from a crude having a high metals content.

*Analysis of products from above example*

| Run | $NiO+V_2O_5$, p. p. m. | |
|---|---|---|
| | 1 | 2 |
| Fraction: | | |
| 850–1,100° F | 3.1 | 6.4 |
| 1,100° F. + | 83.8 | 133.4 |
| On Coke (by difference) | 4,620 | 1,166 |

A comparison of the above data also indicates that the metals tend to concentrate more on a coke which already contains metals. The metal removal would be even better on a third pass of the coke, since the metals content of the coke would be 4 or 5 times higher.

Variations and modifications are possible within the scope of the present invention the essence of which is that a method is provided for the catalytic hydrogenolysis of petroleum products employing a catalyst comprising suspended coke produced in the process and having deposited thereon activating metals contained in the charge stock.

We claim:

1. An improved process for the catalytic hydrogenolysis of refinery residual oils containing at least 60 parts per million of heavy metals, which comprises introducing said residual oil in admixture with hydrogen in an amount of 500 to 20,000 cubic feet per barrel of oil, and 2 to 20 weight percent of said oil of a catalyst, as hereinafter described, into a reaction zone maintained at a temperature in the range of 825 to 950 degrees F., and a pressure in the range of 1000 to 5000 p. s. i. g.; reacting said mixture in said reaction zone for a time sufficient to cause substantial hydrogenolysis whereby coke is formed in an amount of less than 20 weight percent of said oil; removing the reaction products comprising hydrogen, hydrocarbon vapors and liquid hydrocarbons from said reaction zone; separating light gases comprising hydrogen from said reactions products and returning same to said reaction zone as recycle hydrogen; recovering distillate products as products of the process; recovering heavy gas oil as an additional product of the process; recovering low-ash liquid residuum as an additional product of the process; and returning to said reaction zone a portion of said residuum, containing suspended therein, as the sole catalyst for the reaction, coke formed in said hydrogenolysis reaction and having absorbed thereon heavy metals.

2. An improved process for the catalytic hydrogenolysis of refinery residual oil containing at least 60 parts per million of heavy metals which comprises introducing said residual oil, in admixture with hydrogen in an amount of 5,000 to 10,000 cubic feet per barrel of oil, and 4 to 8 weight percent of said oil of a catalyst, as hereinafter described, into a reaction zone maintained at a temperature in the range of 850 to 900 degrees F. and a pressure in the range of 1000 to 3000 p. s. i. g.; reacting said mixture in said reaction zone for a time sufficient to cause substantial hydrogenolysis whereby coke is formed suspended in said oil in an amount less than 20 weight percent of said oil; removing reaction products comprising hydrogen, hydrocarbon vapors and liquid hydrocarbons from said reaction zone; cooling said products to a temperature in the range of 50 to 150 degrees F.; separating and removing light gases therefrom comprising substantially hydrogen; returning said gases to said reactor; reducing the pressure of the remaining hydrocarbon so as to form a liquid phase and a vapor phase; recovering said vapor phase as a product of the process; further reducing the pressure on the remaining hydrocarbons to substantially atmospheric pressure so as to form vapor hydrocarbons and a liquid hydrocarbon phase; recovering hydrocarbon vapors as a product of the process; reducing the pressure on the remaining liquid phase to below atmospheric pressure and raising the temperature to the range of 450 to 700 degrees F.; recovering heavy gas oil in a vapor phase; recovering low-ash-liquid residuum as a product of the process; and returning to said reaction zone a portion of the residuum, containing suspended therein, as the sole catalyst for the reaction, coke formed in said hydrogenolysis reaction and having absorbed thereon heavy metals.

3. An improved process for the catalytic hydrogenolysis of refinery residual oils containing at least 60 parts per million of heavy metals which comprises introducing said residual oil in admixture with hydrogen in an amount of 5,000 to 10,000 cubic feet per barrel of oil and 4 to 8 weight percent of a catalyst, as hereinafter described, into a reaction zone maintained at a temperature in the range of 850 to 900 degrees F., and at a pressure in the range of 1000 to 3000 p. s. i. g.; reacting said admixture in said reaction zone for a time sufficient to cause substantial hydrogenolysis whereby coke is formed suspended and said oil in an amount of less than 20 weight percent of said oil; removing reaction products comprising hydrogen, hydrocarbon vapors and liquid hydrocarbons from said reaction zone to a first separation zone; separating and removing vapors from said first separation zone; cooling said vapors to a temperature in the range of 50 to 150 degrees F.; separating resulting products into a liquid phase and a vapor phase in a second separation zone; passing said vapor phase comprising essentially hydrogen to said reaction zone; reducing the pressure on the remaining liquid in said second separation zone to essentially atmospheric pressure and separating resulting vapors from a resulting liquid; recovering said vapors as a product of the process; recovering said liquid comprising distillate products as products of the process; reducing the pressure on hot liquid products from said first separation zone to substantially atmospheric pressure so as to produce a vapor phase and a liquid phase, recovering said vapor phase comprising distillate products as a product of the process; reducing the pressure on the remaining liquid products to the low atmospheric pressure so as to produce a vapor comprising heavy gas oil and a liquid comprising low-ash residuum as additional products of the process; and returning to said reaction zone a portion of the said residuum, containing suspended therein, as the sole catalyst for the reaction, coke formed in said hydrogenolysis reaction and having absorbed thereon heavy metals.

References Cited in the file of this patent

UNITED STATES PATENTS

| | | |
|---|---|---|
| 1,822,127 | Clancy | Sept. 8, 1931 |
| 1,876,009 | Krauch et al. | Sept. 6, 1932 |
| 1,923,576 | Krauch et al. | Aug. 22, 1933 |
| 1,932,673 | Pier et al. | Oct. 31, 1933 |
| 2,100,353 | Pier et al. | Nov. 30, 1937 |
| 2,187,741 | Houdry | Jan. 23, 1940 |
| 2,614,068 | Healy et al. | Oct. 14, 1952 |
| 2,619,450 | Fleming | Nov. 25, 1952 |
| 2,703,308 | Oblad et al. | Mar. 1, 1955 |
| 2,738,307 | Beckenberger | Mar. 13, 1956 |